(12) United States Patent
Sato et al.

(10) Patent No.: US 6,542,059 B2
(45) Date of Patent: Apr. 1, 2003

(54) SOLENOID FOR ELECTROMAGNETIC VALVE

(75) Inventors: Hideharu Sato, Ibaraki (JP); Yoshio Aso, Ibaraki (JP); Shinichi Yoshimura, Ibaraki (JP); Takumi Matsumoto, Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/207,994

(22) Filed: Jul. 31, 2002

(65) Prior Publication Data

US 2003/0030524 A1 Feb. 13, 2003

(30) Foreign Application Priority Data

Aug. 13, 2001 (JP) ........................................ 2001-245726

(51) Int. Cl.$^7$ ............................................... F16K 31/04
(52) U.S. Cl. ...................... 335/270; 335/255; 335/257; 335/261; 335/277; 335/279; 251/129.15
(58) Field of Search ................................. 335/255, 257, 335/261, 262, 263, 270, 271, 273, 274, 277, 279; 251/129.01, 129.08, 129.09, 129.15

(56) References Cited

U.S. PATENT DOCUMENTS 6,213,445 B1 * 4/2001 Sato et al. .................. 137/909

* cited by examiner

Primary Examiner—Ramon M. Barrera
(74) Attorney, Agent, or Firm—Oblon, Spivak, McClelland, Maier & Neustadt, P.C.

(57) ABSTRACT

A solenoid for an electromagnetic valve is provided with a bobbin on which a coil has been wound, a movable iron core fitted into an iron core hole of the bobbin and a fixed magnetic pole member attracting the movable iron core, the movable iron core has a main body portion with an even section fitted into the iron core hole, and a flange portion with an even section formed on a portion extending from the iron core hole of the main body distal end, and the ring has a first portion which is positioned on a distal end side and which has a large diameter hole in which the flange portion is fitted and a second portion which is positioned on a proximal end side and which has a small diameter hole in which the main body portion is fitted.

8 Claims, 4 Drawing Sheets

SOLENOID FOR ELECTROMAGNETIC VALVE

TECHNICAL FIELD

The present invention relates to a solenoid for an electromagnetic valve which is mounted to an electromagnetic valve to drive a valve member for switching flow paths.

PRIOR ART

As shown in FIG. 4, an electromagnetic valve 50 which has been previously proposed by the present applicant comprises a valve portion 51 provided inside with an unillustrated valve member for switching flow paths and a solenoid portion 52 which is connected to the valve portion 51 to drive the valve member, and the valve member of the valve portion 51 is constituted so as to be opened/closed according to pushing effected by a push rod 60.

The solenoid portion 52 is constituted by assembling, in a cylindrical magnetic body case 53 provided at one end with an opening portion connected with the valve portion 51, a bobbin 55 having a coil 54 wound around an outer periphery thereof, a magnetic body plate 59 which has been attached to an end side of the opening of the magnetic body case 53, and a fixed iron core 56 and a movable iron core 58 which have been inserted into central holes of the magnetic body plate 59 and the bobbin 55.

A proximal end portion of the movable iron core 58 is opposed to the fixed iron core 56, and a distal end portion thereof is fitted with a cap 61 serving as both a stopper and a spring seat. This cap 61 has a butting portion 61c at its proximal end portion, and the butting portion serves such that, when the movable iron core 58 has been attracted to the fixed iron core 56, the butting portion 61c abuts on the magnetic body plate 59 to stop the movable iron core 58 just before the movable iron core 58 strikes against the fixed iron core 56, and it has a function for preventing impact noise from being generated due to an impact.

Also, a flange portion 61a is provided at an outer periphery of the cap 61, and a return spring 57 is provided between the flange portion 61a and the magnetic body plate 59, so that the movable iron core 58 is always biased by the force of the return spring 57 in a direction of pressing the push rod 60 towards the valve portion 51 side. Furthermore, a recessed portion 61b provided on an inner peripheral face of the cap 61 is engaged with a projection portion 58a provided on the movable iron core 58, so that the cap 61 is prevented from falling off from the movable iron core 58.

In the electromagnetic valve 50 having such a constitution, when the coil 54 in the solenoid portion 52 is energized, as shown on a right half in FIG. 4, the movable iron core 58 is attracted to a magnetic pole surface 56c of the fixed iron core 56 and the butting portion 61a of the cap 61 abuts on the magnetic body plate 59 to stop. On the other hand, in a de-energized state of the coil, as shown on a left half in FIG. 4, the movable iron core 58 is separated from the magnetic pole surface 56c by biasing force of a return spring 57 to push the push rod 59 so that the valve member is driven in linkage with the push rod.

Now, in general, in such a solenoid for an electromagnetic valve, there often occurs a case that such a member as the cap 61 is attached on a distal end of the movable iron core 58 for the use object as a stopper, a spring seat or the like. Such a member is easy to receive a force acting to come off from the movable iron core by action of an external force such as an impact force or a biasing force of a spring occurring at a time of operation of the movable iron core, for example, in such a case that the member functions as a stopper or spring seat. For this reason, such a member must securely be mounted to the movable iron core so as not to displace or fall off easily. In addition, a constitution for attaching the member must be simplified as much as possible and a mounting work must be simplified.

In the above known example, since the recessed portion 61b of the cap 61 is engaged with the projection portion 58a of the movable iron core 58, the cap 61 does not fall off from the movable iron core 58. However, since the cap 61 must be fitted on the movable iron core 58 from a distal end side of the iron core while a force exceeding a resistance force due to the projection portion 58a is being applied, a large force is required so that a mounting work becomes troublesome.

DISCLOSURE OF THE INVENTION

In view of the above, an problem of the present invention is to allow a member having a function as a stopper, a spring seat or the like to be securely mounted to a distal end of a movable iron core in a solenoid for an electromagnetic valve with a simple constitution.

In order to solve the above problem, a solenoid of the present invention comprises: a bobbin made from non-magnetic body, which has a iron core hole extending in an axial direction and which has a coil wound on an outer periphery thereof; a magnetic body case which covers a side face of the bobbin and one end face thereof in the axial direction; an annular magnetic body plate coupled to the magnetic body case on the side of the other end face of the bobbin; a movable iron core which is received movably in the iron core hole of the bobbin; a fixed magnetic pole member which attracts the movable iron core; and a return spring which biases the movable iron core in a direction of separating from the fixed magnetic pole member.

Then, the movable iron core has a main body portion with an even section fitted into the iron core hole, and a flange portion with an even section formed on a portion extending from the iron core hole of the distal end of the main body portion, a ring is fixedly fitted on an outer periphery of the distal end of the movable iron core at a position where it spans over the main body portion and the flange portion. Also, the ring has a first portion which is positioned on a distal end side and which has a large diameter hole in which the flange portion is fitted and a second portion which is positioned on a proximal end side and which has a small diameter hole in which the main body portion is fitted.

Since the present invention has such a constitution, the ring can easily be mounted on the movable iron core with a relatively small force by fitting the ring from the proximal end portion of the main body portion of the small diameter of the movable iron core to move it towards the distal end side. Also, even when such an external force as an impact force or a biasing force of the spring at an operation time of the movable iron core acts on the ring in a direction in which the ring is caused to move to the distal end side of the movable iron core, since an engaging force of the ring with the flange portion is rather strengthened by the external force, a mounting state of the ring is further secured.

According to a specific constitution aspect of the present invention, the ring is made from synthetic resin and is formed with a stopper for the movable iron core, and the proximal end portion of the second portion in the ring is provided with a butting portion which abuts on the magnetic body plate when the movable iron core is attracted to the fixed magnetic pole member. Also, this ring may be a spring seat for the return spring. In this case, a flange-shaped spring receiving portion which supports one end of the return spring is provided on the outer periphery of the ring.

In the present invention, the sectional shapes of the iron core hole, the movable iron core and the ring may respectively be formed in an elliptic shape. In this case, it is preferable that a recessed groove for forming a gap between the movable iron core and the iron core hole is provided in an axial direction on the main body portion of the movable iron core on either one or both of the sides faces in the short diameter direction of the ellipse.

Also, the movable iron core may be formed of a metal sintered body obtained by compression-molding metal powder to sinter the same.

DETAILED DESCRIPTION

Figure 1:
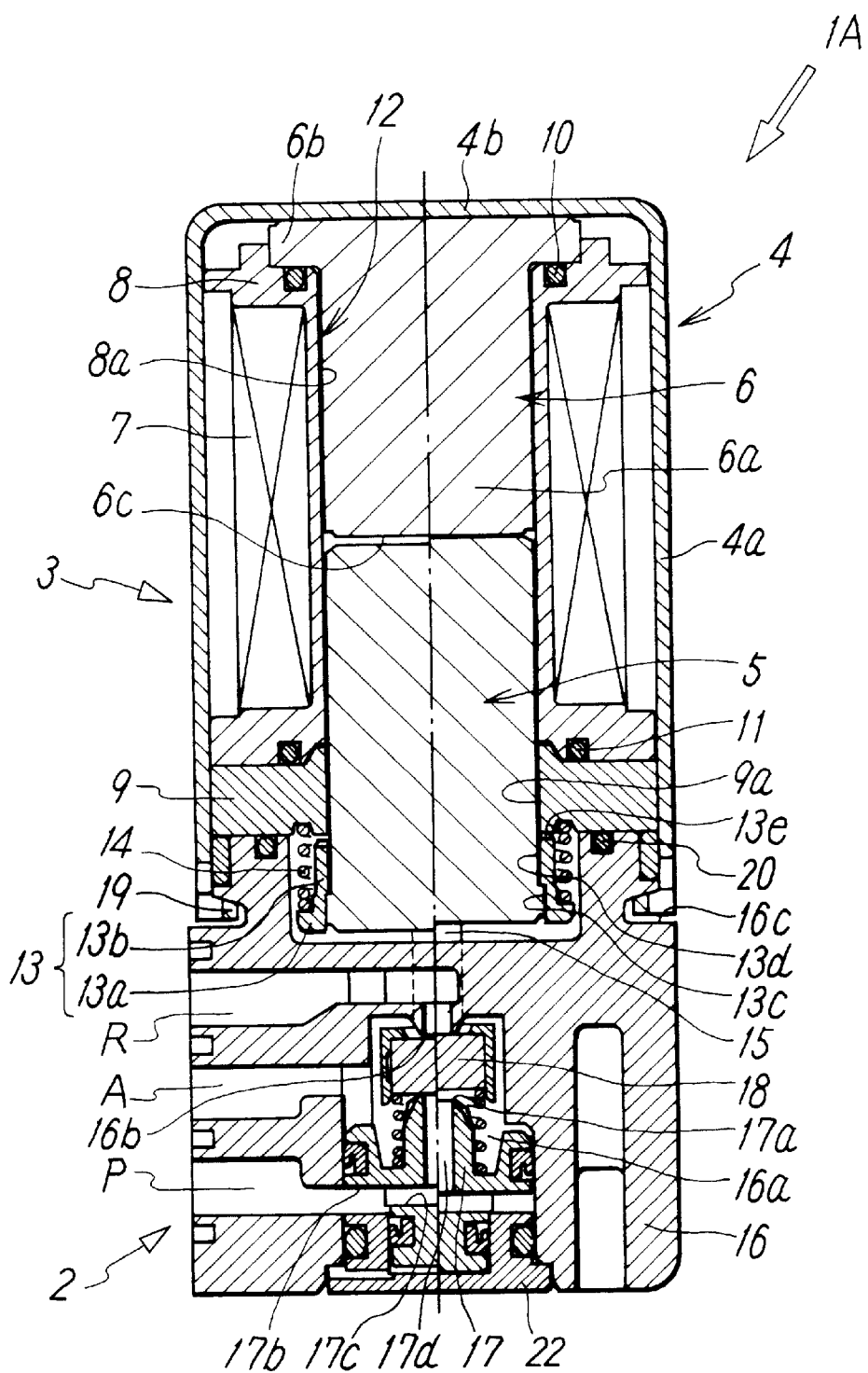
FIG. 1 shows a first embodiment of an electromagnetic valve provided with a solenoid for an electromagnetic valve according to the present invention, a left half showing a de-energized state to the solenoid and a right half showing an energized state to the solenoid.

FIG. 1 shows a first embodiment of the present invention, and illustrates a case where a solenoid for an electromagnetic valve is applied to a 3-port type electromagnetic valve. This electromagnetic valve 1A is provided with a valve portion 2 in which a valve member 18 for switching flow paths is housed and the solenoid 3 which drives the valve member 18.

The solenoid 3 is provided with a magnetic body case 4. The magnetic body case 4 comprises a cylindrical wall portion 4a having a generally rectangular sectional shape and a end wall portion 4b which closes one end side of the case in an axial direction thereof, the other end side of the case in the axial direction is opened, and an end portion of a valve body 16 of the valve portion 2 is fitted in an opened end portion of the case.

A bobbin 8 made of non-magnetic body, which has an elliptic central hole 8a at its center and where a coil 7 has been wound around an outer periphery thereof, and a magnetic body plate 9 which is connected to and fixed to an inner peripheral face of the magnetic body case 4 in a state where the magnetic body plate abuts on an end face of the bobbin 8 are provided inside the magnetic body case 4. The magnetic body plate 9 also has an elliptic central hole 9a, and an iron core hole 12 is formed by connecting the central hole 8a of the bobbin 8 and the central hole 9a of the magnetic body plate 9 coaxially. A movable iron core 5 and a fixed iron core 6 having elliptic sectional shapes, respectively, are received within the iron core hole 12.

The fixed iron core 6 constitutes a fixed magnetic pole member attracting the movable iron core 5, and it has a main body portion 6a with a small diameter fitted into the iron core hole 12 and a flange portion 6b with a large diameter contiguous to the main body portion 6a. Then, an outer face of the flange portion 6b abuts on an inner face of the end wall portion 4b of the magnetic body case 4 at a position out of the iron core hole 12 and an inner face of the flange portion 6b abuts on an outer end face of the bobbin 8 via a seal member 10. A distal end of the main body portion 6a serves as a magnetic polar face 6c, and the magnetic polar face 6c is opposed to a proximal end face of the movable iron core 5. Also, the magnetic body plate 9 abuts on an end face of the bobbin 8 via a seal member 11, and an outer peripheral portion thereof is fixed to an inner peripheral face of the cylindrical wall portion 4a of the magnetic body case 4 by such means as welding or the like. Thereby, the bobbin 8 is fixed inside the magnetic body case 4 and the iron core hole 12 is formed by the central hole 8a of the bobbin 8 and the central hole 9a of the magnetic body plate 9.

Figure 2:
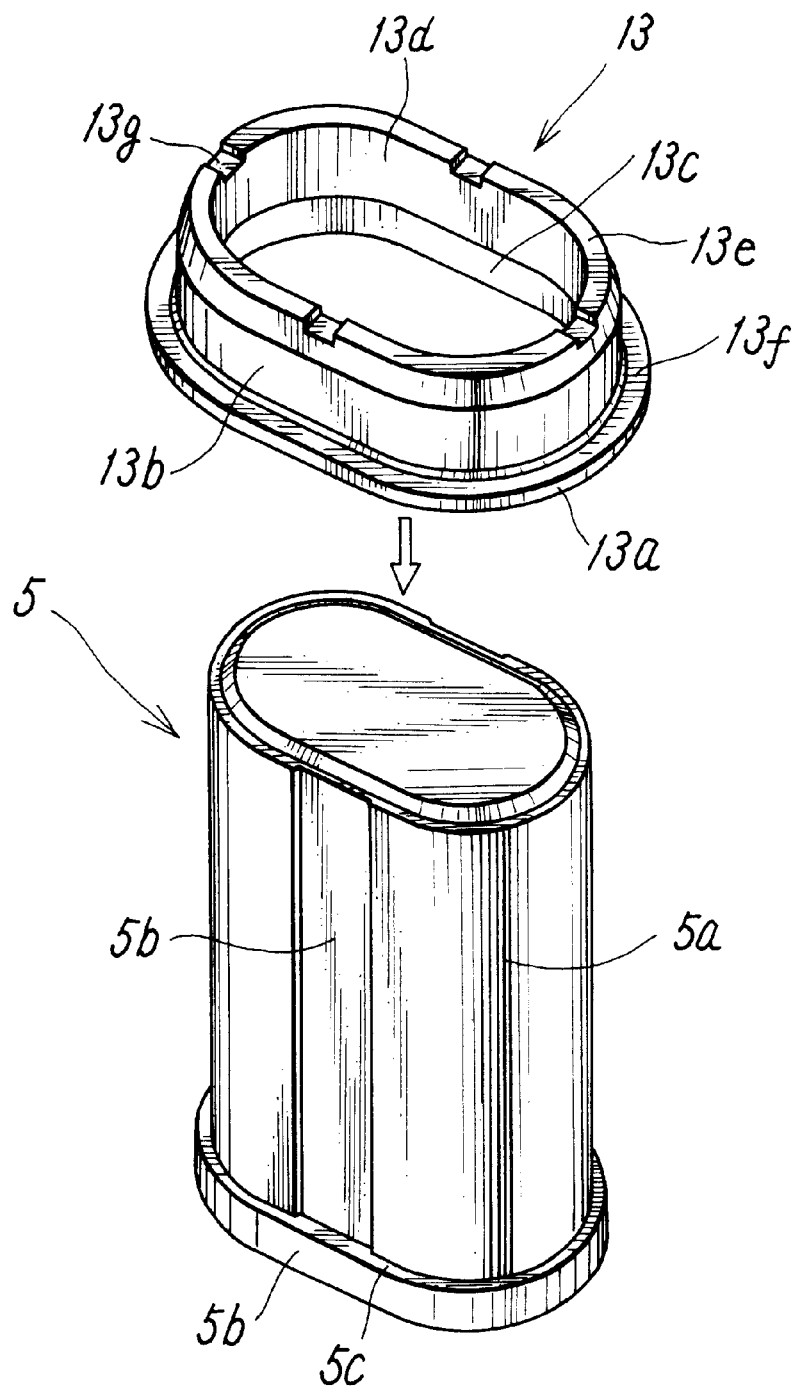
FIG. 2 is a perspective view of a movable iron core.

As understood from FIG. 2, also, the movable iron core 5 has a main body portion 5a with a small diameter and an even section which is movably fitted in the iron core hole 12 and a flange portion 5b with a large diameter and an even section which is formed at a portion extending from the iron core hole 12 at the distal end of the main body 5a, and an elliptic ring 13 made from synthetic resin is fixedly fitted on an outer periphery of a distal end portion of the movable iron core 5 at a position where the ring spans the main body portion 5a and the flange portion 5b. Also, a recessed groove 5d for forming a gap between the main body portion 5a of the movable iron core 5 and the hole face of the iron core hole 12 is provided on either one or both of side faces in a short diameter direction of the ellipse so as to extend in an axial direction.

The ring 13 has a first portion 13a which is positioned at a distal end side and which is provided with a large diameter hole 13c in which the flange portion 5b is fitted and a second portion 13b which is positioned at a proximal end side and which is provided with a small diameter hole 13d in which the main body portion 5a is fitted, and it serves as both a stopper for the movable iron core 5 and a spring seat for a return spring 14. Accordingly, an annular butting portion 13e abutting on the magnetic body plate 9 when the movable iron core 5 is attracted to the fixed iron core 6 is formed on a proximal end portion of the second portion 13b, a flange-shaped spring receiving portion 13f is formed on an outer periphery of the first portion 13a, and the return spring 14 is provided between the spring receiving portion 13f and the magnetic body plate 9. In the figure, reference numeral 13g denotes a notch formed at the proximal end portion of the second portion 13b and it is for preventing the butting portion 13e from coming into close contact with the magnetic body plate 9.

When the ring 13 is mounted to the movable iron core 5, after the first portion 13a of the ring 13 is fitted on the proximal end portion of the main body portion 5a with a small diameter, the ring 13 is moved towards the distal end side of the movable iron core 5, so that the ring is fixed at a position where it spans the main body portion 5a and the flange portion 5b, as described above. At this time, it is preferable that the ring 13 is positioned by abutting of the distal end of the small diameter hole 13d on a stepped portion 5c between the main body portion 5a and the flange portion 5b. In this manner, the ring 13 can easily be mounted to the movable iron core 5 with a relatively small force by fitting the ring 13 from the proximal end portion of the main body portion 5a with a small diameter in the movable iron core 5 to move it to the distal end side.

Incidentally, the sectional shapes of the movable iron core 5 and the fixed iron core 6 are "elliptic", but in this case, the concept "ellipse" includes an oval shape, such as shape as a shape obtained by diving a circle in two halves at a center to stretch them in left and right directions. Also, in case that it is difficult to cut the movable iron core 5 and the fixed iron core 6 in such an elliptic shape, they can be formed from metal sintered body obtained by compression-molding metal powder to sinter the same.

In the solenoid 3 provided with such a constitution, in case that the coil 7 is put in a de-energized state, the movable iron core 5 is not attracted to the fixed iron core 6, so that the movable iron core 5 is advanced by a biasing force of the return spring 14, the movable iron core occupies a position where it has been separated from the fixed iron core 6, as shown on a left half in FIG. 1, namely, the butting portion 13e of the ring 13 has been separated from the magnetic body plate 9, and it is caused to abut on a push rod 15 of the valve portion 2 described later to push it. On the other hand, when the coil 7 is energized, the movable iron core 5 is attracted to the fixed iron core 6 against the biasing force of the return spring 14 to operate in a direction of releasing the pushing force of the push rod 15, as shown on a right half in FIG. 1. Then, the butting portion 13e of the ring 13 abuts on the magnetic body plate 9 just before the movable iron core 5 is attracted to the fixed iron core 6, so that the movable iron core 5 stops at this position. At this time, such external forces as an impact force generated when the ring 13 abuts on the magnetic body plate 9, the biasing force of the return spring 14 and the like act in a direction of moving the ring 13 towards the distal end side of the movable iron core 5, but the ring 13 is rather caused to abut on the flange portion 5b strongly by these external forces to enhance its engaging force so that a mounting state of the ring 13 is further secured.

Next, the valve portion 2 will be explained in detail with reference to FIG. 1. The valve portion 2 has the valve body 16 described above, and the valve body 16 is provided with an input port P, an output port A and a discharge port R, and a valve chamber 16a communicating with each of these ports. One end of the valve chamber 16a is closed by an end block 22, a movable orifice member 17 whose one portion is supported by the end block 22 and which is freely displaced and the valve member 18 of a poppet type which opens/closes a supply valve seat 17a on the orifice member 17 are disposed within the valve chamber 16a, and a distal end of the push rod 15 abuts on the valve member 18.

The orifice member 17 is provided with the supply valve seat 17a opened in the valve chamber 16a, a tube passage 17d which causes the supply valve seat 17a and the input port P to communicate with each other, and a first pressure receiving face 17b and a second pressure receiving face 17c on which fluid pressure from the input port P acts in a direction of the valve member 18 and in a direction opposed thereto. Then, the orifice member 17 is received in the valve chamber 16a slidably in an axial direction thereof, namely, in a direction in which the supply valve seat 17a and the valve member 18 approach to/separate from each other. Incidentally, the first pressure receiving face 17b has a larger pressure receiving area than that of the second pressure receiving face 17c on which the fluid pressure acts in the opposed direction, so that the orifice member 17 can be moved between a position of approaching to the valve member 18 and a position of separating therefrom by the fluid pressure acting force acting on the first pressure receiving face 17b.

Also, the valve member 18 is movably disposed between a discharge valve seat 16b which causes the discharge port R and the valve chamber 16a to communicate with each other and the supply valve seat 17a, and it is for opening/ closing both the valve seats according to operation of the solenoid 3.

Then, the valve portion 2 and the solenoid 3 are tightly coupled to each other via a seal member 20 by caulking a caulking portion 19 provided on a periphery of the opening of the magnetic body case 4 into a groove portion 16c recessed in the valve body 16 of the valve portion 2.

In the electromagnetic valve 1 having such a structure, in case that the solenoid 3 is put in a de-energized state, as shown on the left half in FIG. 1, the movable iron core 5 pushes the valve member 18 on to the supply valve seat 17a of the movable orifice member 17 via the push rod 15 to close the supply valve seat 17a and simultaneously open the discharge valve seat 16b. For this reason, the output port A communicates with the discharge port R via the valve chamber 16a and the discharge valve seat 16b, so that the output port A and the valve chamber 16a become atmospheric. Also, when fluid pressure supplied from the input port P acts on the both pressure receiving faces 17b and 17c of the tube passage 17d, the movable orifice member 17 moves in the direction of the valve member 18 due to a difference in acting force between them to press the supply valve seat 17a on the valve member 18. That is, the valve member 18 and the movable orifice member 17 are pressed in a direction in which they are caused to abut on each other, so that the supply valve seat 17a is moved towards the valve member 18 side, thereby reducing a stroke of the movable iron core at the next energizing time.

On the other hand, when the solenoid 3 is energized, as shown on the right half in FIG. 1, pressing on the valve member 18 effected by the movable iron core 5 and the push rod 17 is released so that the valve member 18 opens the supply valve seat 17a and closes the discharge valve seat 16b. Thereby, the discharge port R and the valve chamber 16a are disconnected and the output port A is caused to communicate with the input port P via the valve chamber 16a. Simultaneously, since the pressure of the valve chamber 16a increases, the movable orifice member 17 is pushed back so as to separate from the valve member 18 so that the supply valve seat 17a is opened more widely.

Incidentally, in the above embodiment, the cross-sectional shape of the cylindrical wall portion 4a in the magnetic body case 4 is not limited to the generally rectangular shape, but it may be formed in various shapes such as an ellipse including an oval shape, as needs. Also, regarding the shapes of the central holes 8a and 9a of the bobbin 8 and the magnetic body plate 9 or the sectional shapes of the movable iron core 5 and the fixed iron core 6, they are not limited to the ellipse described above, but they may be circular.

Figure 3:
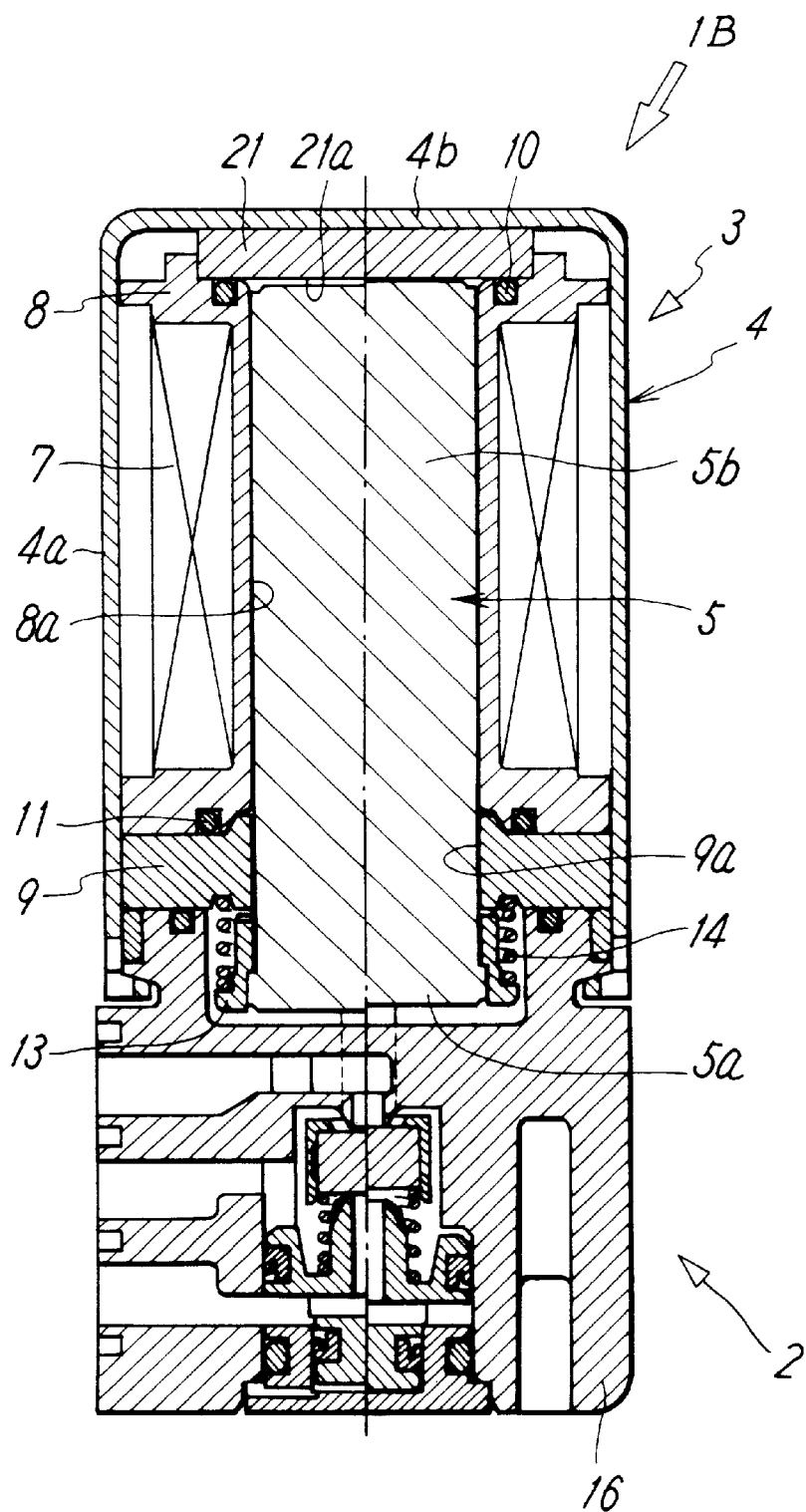
FIG. 3 shows a second embodiment of an electromagnetic valve provided with a solenoid for an electromagnetic valve according to the present invention, a left half showing a de-energized state to the solenoid and a right half showing an energized state to the solenoid.
Figure 4:
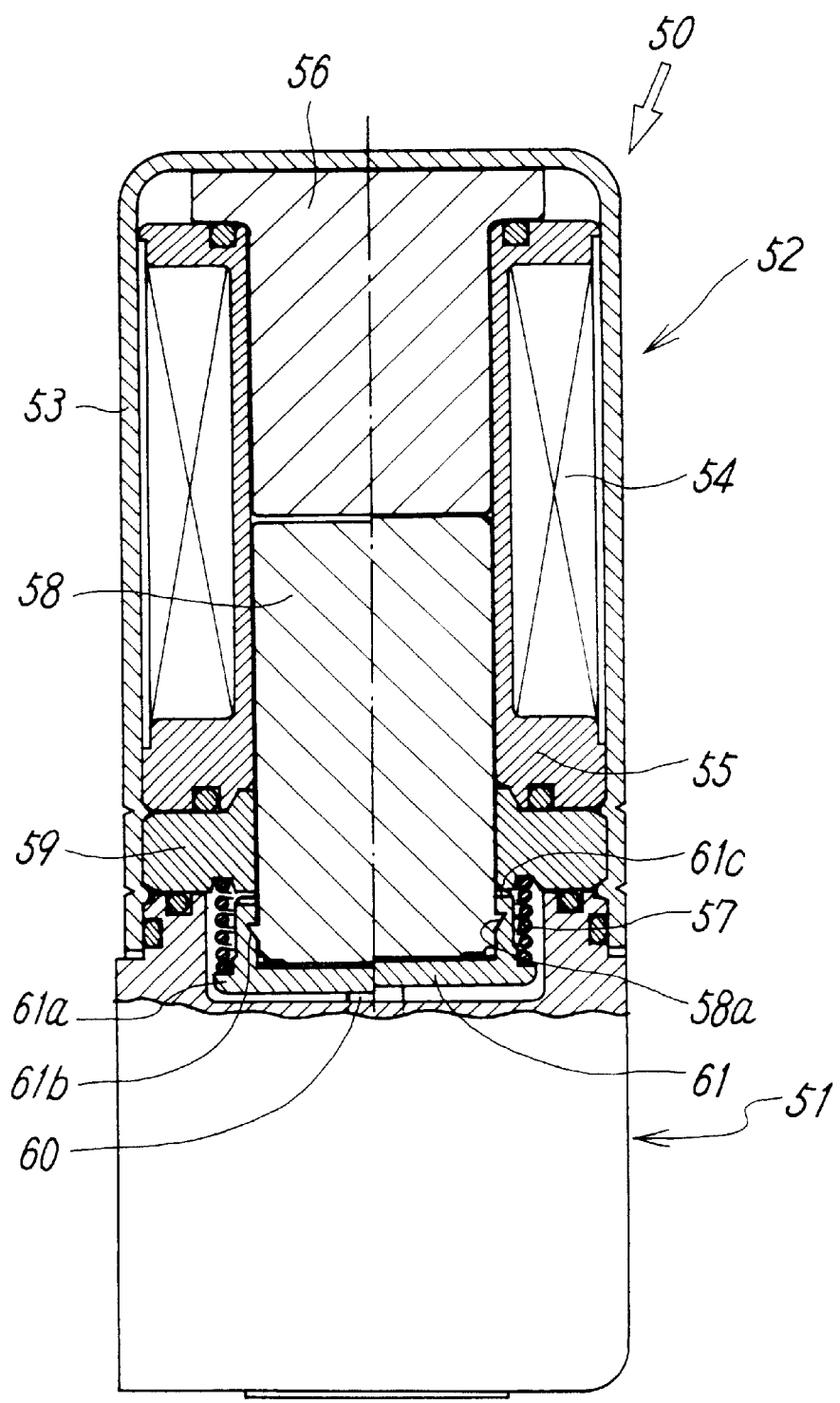
FIG. 4 is a partially longitudinal sectional view of a conventional electromagnetic valve, where a left half shows a de-energized state to a solenoid and a right half shows an energized state to the solenoid.

FIG. 3 shows a second embodiment of the present invention, and an electromagnetic valve 1B of this embodiment is different in constitution of the fixed magnetic pole member from the electromagnetic valve 1A of the above first embodiment. That is, the electromagnetic valve 1A is provided with the fixed iron core 6 fitted into the iron core hole 12 as the fixed magnetic pole member, but the fixed magnetic pole member is constituted by a plate-shaped magnetic pole plate 21 in the electromagnetic valve 1B. This magnetic pole plate 21 is disposed via a seal member 10 at a position where it spans the iron core hole 12 at the end face of the bobbin 8, and it has a magnetic pole face 21a at a portion covering the iron core hole 12. Since this magnetic pole plate 21 is not fitted to the iron core hole 12, the main body portion 5a of the movable iron core 5 is fitted in the iron core hole 12 over the entire length thereof. By providing such a plate-shaped magnetic pole plate 21, it is unnecessary to use the fixed iron core 6 with the complicated shape which comprises the main body portion 6a and the flange portion 6b, so that manufacturing cost for the solenoid 3 can be suppressed to be inexpensive.

Incidentally, since the other constitutions and operations in the second embodiment are not different from those in the first embodiment, principal identical constitution portions are attached with the same reference numerals as those in the first embodiment and explanation thereof will be omitted.

What is claimed is:

1. A solenoid for an electromagnetic valve which is mounted to an electromagnetic valve to drive a valve member for switching flow paths, the solenoid comprising:
   a bobbin made from a non-magnetic body, which has an iron core hole extending in an axial direction and which has a coil wound on an outer periphery thereof;
   a magnetic body case which covers a side face of the bobbin and one end face thereof in the axial direction;
   an annular magnetic body plate coupled to the magnetic body case on the side of the other end face of the bobbin;
   a movable iron core which is received movably in the iron core hole of the bobbin;
   a fixed magnetic pole member which attracts the movable iron core; and
   a return spring which biases the movable iron core in a direction of separating from the fixed magnetic pole member, wherein:
   the movable iron core has a main body portion with an even section fitted into the iron core hole, and a flange portion with an even section formed on a portion extending from the iron core hole of the main body distal end, a ring is fixedly fitted on an outer periphery of the distal end of the movable iron core at a position where it spans over the main body portion and the flange portion, and
   the ring has a first portion which is positioned on a distal end side and which has a large diameter in which the flange portion is fitted and a second portion which is positioned on a proximal end side and which has a small diameter in which the main body portion is fitted.

2. A solenoid according to claim 1, wherein the ring is made from synthetic resin and is formed with a stopper for the movable iron core, and a butting portion abutting on the magnetic body plate when the movable iron core is attracted to the fixed magnetic pole member is provided at a proximal end portion of the second portion in the ring.

3. A solenoid according to claim 1, wherein the ring is made of synthetic resin and is formed with a spring seat for the return spring, and a flange-shaped spring receiving portion which supports one end of the return spring is provided at an outer periphery of the ring.

4. A solenoid according to claim 1, wherein the ring is made from synthetic resin and serves as both a stopper for the movable iron core and a spring seat for the return spring, a butting portion abutting on the magnetic body plate when the movable iron core is attracted to the fixed magnetic pole member is provided at a proximal end portion of the second portion in the ring, and a flange-shaped spring receiving portion which supports one end of the return spring is provided at an outer periphery of the ring.

5. A solenoid according to claim 1, wherein the sectional shapes of the iron core hole, the movable iron core and the ring are respectively elliptic.

6. A solenoid according to claim 5, wherein the main body portion of the movable iron core is provided on either one or both of side faces in a short diameter direction of the ellipse with a recessed groove for forming a gap between the main body portion and the iron core hole which extends in an axial direction.

7. A solenoid according to claim 1, wherein the movable iron core comprises a metal sintered body obtained by compression-molding metal powder to sinter the same.

8. A solenoid according to claim 1, wherein the ring is made from synthetic resin and serves as both a stopper for the movable iron core and a spring seat for the return spring, a butting portion abutting on the magnetic body plate when the movable iron core is attracted to the fixed magnetic pole member is provided at a proximal end portion of the second portion in the ring; a flange-shaped spring receiving portion which supports one end of the return spring is provided at an outer periphery of the ring; wherein the sectional shapes of the iron core hole, the movable iron core and the ring are elliptic; and the main body portion of the movable iron core is provided on either one or both of side faces in a short diameter direction of the ellipse with a recessed groove for forming a gap between the main body portion and the iron core hole which extends in an axial direction.

* * * * *